United States Patent
Anglin et al.

(10) Patent No.: US 10,599,768 B2
(45) Date of Patent: *Mar. 24, 2020

(54) INTELLIGENT PSEUDO TRANSLATION

(71) Applicant: International Business Machines Corporation, Armonk, NY (US)

(72) Inventors: Debbie A. Anglin, Leander, TX (US); Su Liu, Austin, TX (US); Boyi Tzen, Taipei (TW); Fan Yang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/397,437

(22) Filed: Apr. 29, 2019

(65) Prior Publication Data

US 2019/0303444 A1 Oct. 3, 2019

Related U.S. Application Data

(63) Continuation of application No. 15/423,698, filed on Feb. 3, 2017, now Pat. No. 10,366,172.

(51) Int. Cl.
*G06F 17/28* (2006.01)
*G06F 17/27* (2006.01)
*G06F 17/22* (2006.01)

(52) U.S. Cl.
CPC ........ *G06F 17/275* (2013.01); *G06F 17/2217* (2013.01); *G06F 17/2223* (2013.01); *G06F 17/289* (2013.01); *G06F 17/2854* (2013.01)

(58) Field of Classification Search
CPC ... G06F 17/289; G06F 17/2854; G06F 17/275
USPC .............................................................. 704/2
See application file for complete search history.

(56) References Cited

U.S. PATENT DOCUMENTS

| 6,507,812 B1 * | 1/2003 | Meade | G06F 9/454 704/8 |
|---|---|---|---|
| 7,698,688 B2 | 4/2010 | Fujiwara et al. | |
| 7,752,501 B2 | 7/2010 | Bak | |
| 7,793,156 B2 * | 9/2010 | Tsurumi | G06F 11/3696 714/38.14 |

(Continued)

OTHER PUBLICATIONS

List of IBM Patents or Applications Treated as Related, Apr. 2019.

(Continued)

*Primary Examiner* — Edwin S Leland, III
(74) *Attorney, Agent, or Firm* — Lieberman & Brandsdorfer, LLC

(57) ABSTRACT

Adaptive pseudo translation provides dynamic adjustment of a generated pseudo translation based on one or more rules and one or more dynamically detected parameters. Data is received and an adaptive pseudo translation is initiated. A string is extracted from the received data and an encoding and a language of the string are detected. A target language is proactively selected based on a parameter. A buffer size is dynamically determined based on the detected encoding, detected language, and target language. The extracted string is dynamically transformed into pseudo translated text based on the buffer size. The dynamically generated pseudo translation provides a highly accurate mock translation to one or more target languages.

20 Claims, 7 Drawing Sheets

(56) References Cited

U.S. PATENT DOCUMENTS

| | | | |
|---|---|---|---|
| 8,160,865 B1* | 4/2012 | Coughlan | G06F 17/248 704/4 |
| 8,302,087 B2* | 10/2012 | Ayachitula | G06F 8/4434 717/141 |
| 8,392,872 B2 | 3/2013 | Bak et al. | |
| 8,924,934 B2* | 12/2014 | Sullivan | G06F 11/3664 715/716 |
| 9,262,407 B1* | 2/2016 | Ermann | G06F 17/28 |
| 9,400,784 B2* | 7/2016 | Lerum | G06F 9/454 |
| 9,898,418 B2* | 2/2018 | Eddy | G06F 12/1027 |
| 9,910,554 B2* | 3/2018 | Gu | G06F 3/0481 |
| 2001/0013116 A1* | 8/2001 | Watanabe | G06F 9/454 717/100 |
| 2002/0111322 A1* | 8/2002 | Rothnagel | C12N 15/67 514/44 R |
| 2005/0050526 A1* | 3/2005 | Dahne-Steuber | G06F 9/454 717/136 |
| 2006/0106593 A1* | 5/2006 | Schultz | G06F 17/212 704/5 |
| 2007/0050427 A1* | 3/2007 | Atkin | G06F 17/2247 |
| 2007/0169013 A1* | 7/2007 | Bak | G06F 9/454 717/136 |
| 2008/0033711 A1* | 2/2008 | Atkin | G06F 9/454 704/2 |
| 2008/0127103 A1* | 5/2008 | Bak | G06F 9/451 717/126 |
| 2008/0172637 A1* | 7/2008 | Chang | G06F 17/289 715/846 |
| 2009/0037830 A1* | 2/2009 | Kulkarni | G06F 9/454 715/764 |
| 2009/0248396 A1* | 10/2009 | Fujiwara | G06F 9/454 704/8 |
| 2013/0007588 A1* | 1/2013 | Guo | G06F 11/3688 715/234 |
| 2014/0006004 A1* | 1/2014 | Gundepuneni | G06F 17/2264 704/2 |
| 2014/0089827 A1* | 3/2014 | Gu | G06F 3/0481 715/765 |
| 2016/0162478 A1* | 6/2016 | Blassin | G06Q 10/06311 |
| 2016/0342524 A1* | 11/2016 | Eddy | G06F 12/1027 |
| 2018/0225285 A1* | 8/2018 | Anglin | G06F 17/289 |

OTHER PUBLICATIONS

U.S. Appl. No. 15/423,698, filed Feb. 3, 2017, US Pat. Pub. No. 2018-0225285 A1.

* cited by examiner

INTELLIGENT PSEUDO TRANSLATION

CROSS REFERENCE TO RELATED APPLICATION(S)

This application is a continuation patent application claiming the benefit of the filing date of U.S. patent application Ser. No. 15/423,698 filed on Feb. 3, 2017 and titled "Intelligent Pseudo Translation", now pending, is hereby incorporated by reference.

BACKGROUND

The present embodiments relate to pseudo translation. More specifically, the embodiments relate to adaptive adjustment of a generated pseudo translation based on one or more rules and one or more dynamically detected parameters.

Output from computer program instructions may be found in the form of a sequence of characters, known as a string. More specifically, string is utilized to represent output from execution of the program instructions in a text format, also known as a character string. It is understood that the character string may require translation depending on geographic utilization of the program instructions. Computer program instructions are commonly localized for geographic regions to alleviate translation concerns of the character string. The localization process may include actual translation of the software from the original language and original encoding to a local language of the region where the software is in use or is intended for use. It is understood that such translation process may include a lengthy and time consuming manual translation from the original language of the character string and encoding the translation in a software development life cycle.

Translation of the programming language and/or string related to the programming language may lead to errors in the operation and/or display. The translation is typically performed near the end of the software development cycle and errors detected in the translation may require modification to computer software in the original language and re-translation of the software. Performing the translation may be expensive and time consuming. Moreover, the greater the quantity of translation attempts and the more languages to translate may increase the cost and amount of time required in order to generate a translated version of the software.

SUMMARY

A system, computer program product, and method are provided for pseudo translation of character string. More specifically, embodiments relate to adaptive adjustment of a generated pseudo translation based on one or more rules and one or more dynamically detected parameters.

In one aspect, a system is provided with a processing unit in communication with memory, and a functional unit in communication with the processing unit to adaptively generate a pseudo translation. More specifically, the functional unit is provided with tools to support the translation. In response to selection of a first target language, the tool dynamically determines a buffer size based on a detected original language, a detected encoding, and the selected first target language. The tool generates one or more first buffer characters corresponding to a first buffer size, and dynamically transforms an extracted string of received data into first pseudo translated text. The dynamic transformation includes combining first buffer characters and the extract string, and encapsulating the combination with a placeholder character set.

In another aspect, a computer program product is provided for adaptively generating a pseudo translation. The computer program product includes a computer readable storage medium with embodied program code that is configured to be executed by a processing unit. In response to selection of a first target language, program code dynamically determines a buffer size based on a detected original language, a detected encoding, and the selected first target language. The program code generates one or more first buffer characters corresponding to a first buffer size, and dynamically transforms an extracted string of received data into first pseudo translated text. The dynamic transformation includes the program code to combine first buffer characters and the extract string, and encapsulate the combination with a placeholder character set.

In yet another aspect, a method is provided for adaptively generating a pseudo translation. In response to selection of a first target language, a buffer size is determined based on a detected original language, a detected encoding, and the selected first target language. One or more first buffer characters corresponding to a first buffer size are generated, and an extracted string of received data is dynamically transformed into first pseudo translated text. The dynamic transformation includes combining first buffer characters and the extract string, and encapsulating the combination with a placeholder character set.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
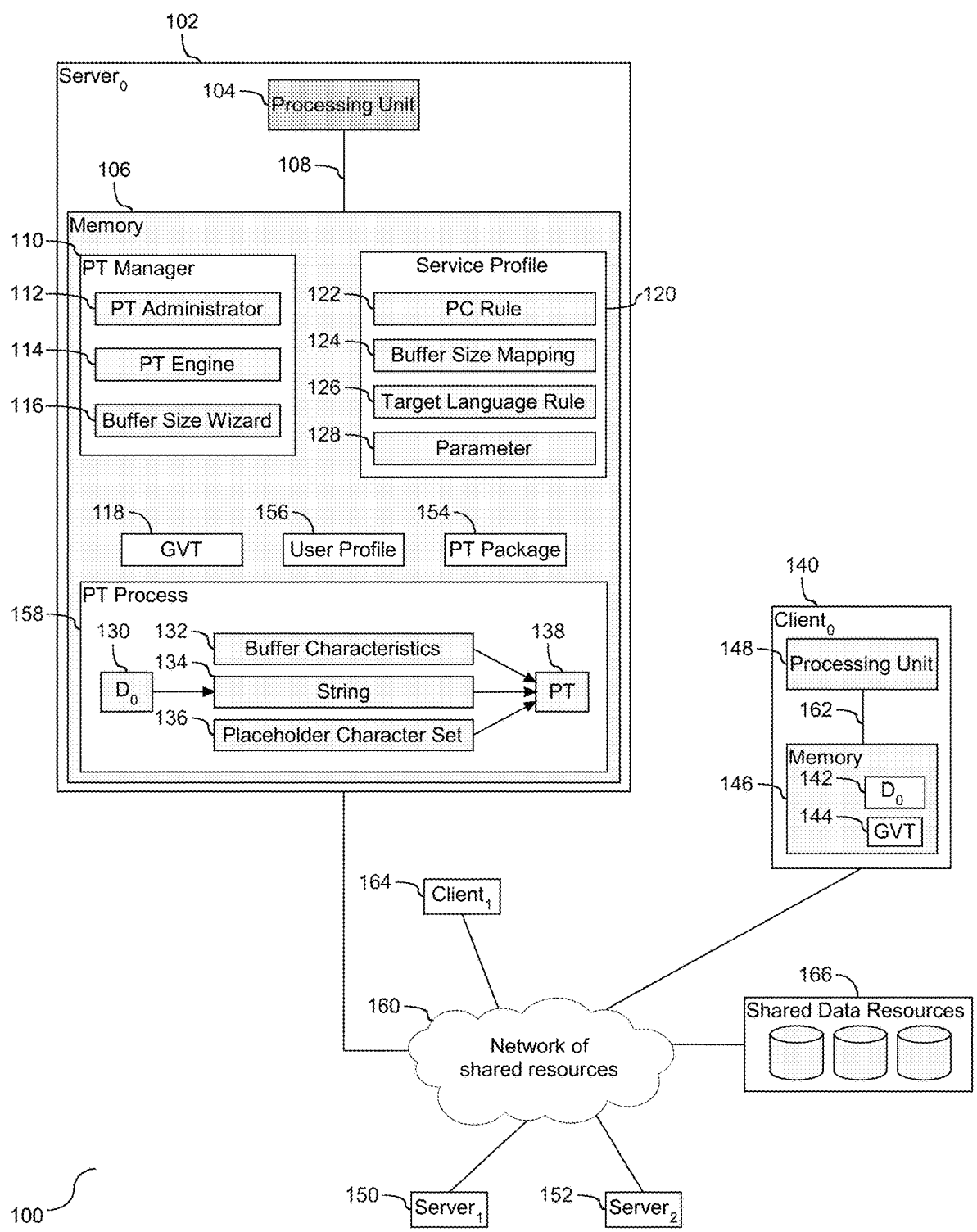
FIG. 1 depicts a block diagram illustrating a computer system that supports adaptive pseudo translation.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein A pseudo translation of software, a message, data, and/or string, hereinafter collectively referred to as data, from the origin language to the target language is not an accurate translation from its original form in the origin language to the target language with respect to content. More specifically, pseudo translation is a form of translation that has a basis with the original data, with the pseudo translation being an imitation of both performance and display of a string translation in the target language. Accordingly, the pseudo translation is a mock translation that imitates the display and performance of an actual translation into the target language but does not perform the translation.

The pseudo translation is employed to efficiently model translation. In one embodiment, the pseudo translation may be used for a globalization verification test (GVT) in order to determine any potential errors without performing the translation. Similarly, the pseudo translation may be performed in the development stage of software in order to eliminate potential errors, bugs, and/or issues that may arise after performing the translation of the software to one or more target languages.

There are two categories of pseudo translation, including static pseudo translation and adaptive pseudo translation. Static pseudo translation is a predefined translation which is non-specific to a particular target language. The static pseudo translation has a predefined buffer size (the buffer size may also be specified as a limit of displayable area on Graphic User Interface), also known as a static buffer size. The static pseudo translation may require a skilled operator to correctly set one or more parameters of the static pseudo translation to meet constraints related to the buffer size. Accordingly, the static pseudo translation does not dynamically adapt for a particular target language(s) the pseudo translation is intended to mock.

A system, method, and computer program product are disclosed and described herein to support adaptive pseudo translation, also known as intelligent pseudo translation. The adaptive translation employs one or more rules and one or more dynamically detected parameters. The dynamic pseudo translation analyzes a character string, hereinafter referred to as string. The analysis includes detection of string encoding (e.g. UTF-8, IBM-943, IBM-eucJP, etc.), hereinafter referred to as origin encoding. For example, string in the same origin language can be encoded differently and the encoding may depend on a product specification or design. The analysis also includes detection of the string language (e.g. English, Chinese, Japanese, etc.), hereinafter referred to as origin language. A target language to support the pseudo translation is proactively selected based on a parameter. A buffer size is dynamically determined based on the detected origin encoding and origin language, and the selected target language. The buffer size is configured to dynamically adjust based on a change to any one of the following: the detected origin encoding, the detected origin language, and the selected target language. The dynamic pseudo translation transforms the analyzed string in the origin language into pseudo translated string in the target language based on the buffer size. Accordingly, the pseudo translation adapts to changes in settings and/or parameters in order to provide an accurate mock translation of a selected target language.

Referring to FIG. 1, a block diagram (100) is provided illustrating a computer system that supports adaptive pseudo translation. A server, server$_0$ (102), is shown configured with a processing unit (104) in communication with a memory (106) across a bus (108). Server$_0$ (102) is also shown in communication with a network of shared resources (160) across a network connection to provide access to shared resources, including, but not limited to, shared data resources (166), client machines, client$_0$ (140) and client$_1$ (164), and other servers, server$_1$ (150) and server$_2$ (152). The quantity of client machines and servers shown and described herein are for illustrative purposes and should not be considered limiting.

Server$_0$ (102) is shown herein with a pseudo translation (PT) Manager (110) which supports a plurality of functions including configuring, coordinating, and/or adaptively generating a pseudo translation in a target language from a string in the origin language. As shown, the PT manager (110) is stored in memory (106) for execution by processing unit (104), although in one embodiment, the PT manager (110) may be in the form of an application operatively coupled to the memory (106) for execution by the processing unit (104). In one embodiment, the PT manager (110) is provided in a stand-alone client. In another embodiment, the PT manager (110) is provided as an application platform interface (API). The PT manager (110) utilizes a plurality of tools to support its functionality. These tools include, but are not limited to, a PT administrator (112), a PT engine (114), and a buffer size wizard (116), collectively referred to as PT tool. These tools (112)-(116) support the PT manager (110), and more specifically, support and enable adaptive pseudo translation of string.

As shown, client$_0$ (140), is configured with a processing unit (148) in communication with a memory (146) across a bus (162). Client$_0$ (140) is configured with data, D$_0$ (142) stored in memory (146). In the example shown herein, client$_0$ (140) employs the PT manager (110) to support a request to adaptively pseudo translate string present in data, such as D$_0$ (142). In one embodiment, the PT manager (110) employs or provides a graphical user interface (GUI) to client$_0$ (140), and initializes PT administrator (112) to support configuration of an adaptive pseudo translation and uploading of data, such as data D$_0$ (142). The configuration of the adaptive pseudo translation can include configuration of a placeholder character (PC) rule (122), target language rule (126), parameter (128), and user profile (156). Accordingly, the PT administrator (112) supports configuration of an adaptive pseudo translation.

The PC rule (122) defines the placeholder character set that may be used to define the start (e.g. head) and the end (e.g. tail) of the pseudo translation. The placeholder character set may be based on, but is not limited to, a predefined setting, application language, encoding, or type of data. In one embodiment, the PC rule (122) defines ASCII punctuation used in a placeholder character set. For example, the PC rule (122) may define "[" as the head of the pseudo translation and "]" as the tail of the pseudo translation. The user profile (156) may include a default string language for both the origin (e.g. input) and the target (e.g. output), default string encoding for input and output, input and output format, and file name extensions. In one embodiment, the user profile (156) is associated with a select client. With respect to the buffer, size constraints may be based on a variety of factors, including but not limited to, a limit of displayable area on a button, a dialog box, a tooltip area in visible displayed areas, or a temporal storage for holding content for text and/or string information processing. The parameter (128) may include a buffer size limit, such as a maximum size or minimum size. Accordingly, placeholder character rule (122), user profile (156), and parameters (128) contain one or more settings/parameters to support the adaptive pseudo translation.

The target language rule (126) defines one or more target languages that support the pseudo translation. Each target language that is the subject of the target language rule (126) is supported for the pseudo translation. In one embodiment, target language rule (126) includes a plurality of target languages that may be the subject for the pseudo translation. In one embodiment, the pseudo translation may actually be a plurality of pseudo translations, with each translation directed at a different target language, and in one embodiment, each translation taking place in a consecutive manner with respect to a prior pseudo translation. For example, after performance of a first pseudo translation for a first selected or identified target language, a second target language is either selected or identified for performance of a second pseudo translation, with the first and second pseudo translations employing the same origin language. In one embodiment, the target language rule (126) may encompass a plurality of rules, with selection of any of the rules for the adaptive translation based on, but not limited to, a client, an accessing entity, the source data file, origin language, origin encoding, ranking, and a predefined selection. In one embodiment, the target language rule (126) includes one or more target languages organized in a list. Accordingly, target language rule (126) supports the pseudo translation (PT) process (158) by providing at least one target language selection that the data should be translated into and in one embodiment, with respect to multiple target languages an order in which to perform each pseudo translation.

As shown, data, $D_O$ (142), present in memory (146) is uploaded to $server_O$ (102) from $client_O$ (140) and stored as $D_O'$ (130) where the uploading and storing of the data is supported by the PT administrator (112). Following receipt of the data from the $client_O$ (140) that is the subject of the pseudo translation, the PT Manager (110) activates the PT engine (114) to analyze the received data, hereinafter referred to as source data. The analysis of the source data begins with the PT engine (114) extracting string (134) from the source data, such as uploaded $D_O'$ (130) and in one embodiment, data $D_O$ (142). The string (134) extracted from source data is hereinafter referred to as source string. The PT engine (114) dynamically analyzes the source string (134) including automatically detecting the origin language and origin encoding of extracted source string (134). In one embodiment, the PT engine (114) detects the origin language and/or origin encoding at the time of extraction. The PT engine (114) proactively selects the target language for the pseudo translation. For example, data comprising source string (e.g. origin language) may be associated with an instruction that designates $D_O'$ (130) needs to be tested into the selected target language. Thus, the PT engine (114) proactively selects the target language. The selection of the target language by the PT engine (114) may be supported by the target language rule (126) or a parameter dynamically extracted from a client, such as $client_O$ (140). Accordingly, the PT engine (114) dynamically detects the origin language and encoding and proactively selects a target language to pseudo translate the source string.

Following detection of the origin language and selection of the target language, the PT engine (114) activates the buffer size wizard (116) in order to determine the buffer size that will be used in the PT process (158) with the goal to arrive at an accurate surrogate for the actual translation. An accurate pseudo translation maximizes identification of actual errors (e.g. true-positives) and minimizes identification of false errors as actual errors (e.g. false-positives). In one embodiment, false-positives can lead to un-necessary modification of the source data based on a globalization verification test (GVT) of the pseudo translation. In one embodiment, mis-identification of an actual error (e.g. false-negative) can lead to requiring the source data to be modified after an actual translation is performed and re-performing the actual translation on the modified data. The buffer size wizard (116) consults the PT engine (114) to dynamically determine the origin language and origin encoding of source string (134) extracted from source data, and the selected target language for the PT process (158). The buffer size wizard (116) consults the buffer size mapping (124) within service profile (120) in order to determine a correlation between the origin language and origin encoding of source string (134) and the target language. The buffer size wizard (116) determines a buffer size coefficient based on the determined correlation from the consultation of the buffer size mapping (124). The buffer size wizard (116) determines a size of the source string (134) and utilizes the buffer size coefficient to generate and return a buffer size to the PT engine (114). In one embodiment, the buffer size wizard consults parameters (128) in order to determine whether the buffer size is less than a maximum permitted buffer size. In one embodiment, if the determined buffer size is greater than the maximum permitted buffer size, the PT administrator (112) sends a warning notification to the client requesting the pseudo translation, such as $client_O$ (140). In one embodiment, if the determined buffer size is greater than the maximum permitted buffer size, the buffer size wizard (116) changes the determined buffer size to be the maximum permitted buffer size. Accordingly, the buffer size wizard (116) dynamically and automatically determines a buffer size based on a variety of factors, including but not limited to, the origin language, origin encoding, and selected target language.

The buffer size ensures the pseudo translation is accurate, where if the pseudo translation passes GVT the actual translation from the origin language to the selected target language would physically fit within a defined physical boundary (e.g. window) and/or operate error-free. In another embodiment, the determination of the buffer size may indicate that there is sufficient space in the current size of a window designation to support the pseudo translation. In one embodiment, the size may be, but is not limited to, a length, a width, a height, and a quantity of bytes. Accordingly, the buffer size is utilized in the pseudo translation in order to adapt the size of the source string to accurately represent the size of an actual translation of the source string.

The buffer size mapping (124) defines a relationship between the origin language and encoding and the target language. The buffer size mapping (124) is utilized by the buffer size wizard (116) in order to dynamically account for a size difference between string in the origin language and string actually translated into the target language. This accounting increases the accuracy of the generated pseudo translation. In one embodiment, the buffer size mapping (124) may contain a table defining one or more of the following: one or more geographic regions, an average byte size of a character in a select language and encoding of the select geographic region, an average size of a file in the select language and encoding of the select region, and a comparison to the origin language and a size coefficient of the origin language and encoding in view of the select language. Accordingly, the buffer size mapping (124) supports determination of differences between languages and/or encodings.

The PT engine (114) generates one or more buffer characters (132) based on the buffer size returned from buffer size wizard (116). In one embodiment, the buffer characters (132) are generated in the target language. In one embodiment, the buffer characters may be but are not limited to, random and predefined. The PT engine (114) consults the placeholder character rule (122) to determine a placeholder character set (136) to be used in the PT process (158). In one embodiment, the placeholder character set includes a head character and a tail character. The PT engine (114) dynamically transforms source string (134) into a pseudo translation (PT) (138), thereby creating a mock translation of the source string, and/or source data. In one embodiment, PT (138) is text. The dynamic transformation includes combining source string (134) in the origin language with buffer characters (132) and encapsulating the combination with the placeholder character set (136). In one embodiment, the PT process (158) concatenates the source string (134) and the buffer characters (132). In one embodiment, the pseudo translation includes placing a head character at the beginning of the PT (138) and a tail character at the end of the PT (138). Accordingly, the PT engine (114) dynamically generates PT (138) from source string (134) in the origin language utilizing the PT process (158).

The PT administrator (112) may save a pseudo translation, such as PT (138), in memory (106) within a package (154), referred to herein as a pseudo translation (PT) package. In one embodiment, the pseudo translation package may include one or more of the following: the source data, source string extracted from the source data, and a pseudo translation of the source string. In one embodiment, the PT package (154) contains a single pseudo translation. In one embodiment, the PT package (154) contains multiple pseudo translations and each translation is a pseudo translation of the same source string to a different target language. In one embodiment, the PT package (154) contains multiple corresponding pseudo translations and each pseudo translation may be a pseudo translation of a different source string in the same or different origin language(s). In one embodiment, the PT package (154) contains multiple pseudo translations and each pseudo translation in the package may be a pseudo translation of a different source string into various target languages. In one embodiment, the PT package (154) is a single output file. Accordingly, the PT package (154) contains the output of the PT process (158) in the form of at least one pseudo translation which is a surrogate for an actual translation of the source string into the target language(s).

The PT package (154) may be returned to $client_0$ (140) for a globalization verification test (GVT) by GVT module (144) embedded within memory (146) within $client_0$ (140). In one embodiment, the GVT module (144) may be in the form of an application operatively coupled to the memory (146) for execution by the processing unit (148). In one embodiment, GVT is performed on PT package (154) by GVT module (118) embedded within memory (106) within $server_0$ (102). In one embodiment, the GVT module (118) may be in the form of an application operatively coupled to the memory (106) for execution by the processing unit (104). In one embodiment, a result of the GVT is returned to $client_0$ (140). In one embodiment, the result of the GVT is communicated to the PT engine (114), and based on the results of the GVT the PT engine (114) updates the target language rule (126). The update may include addition and/or removal of one or more targets languages from target language rule (126). Accordingly, GVT may be performed on a pseudo translation, and based on the result of the GVT the target language rule (126) may be updated.

Data, such as $D_0$ (142) and $D_0'$ (130), is not limited to being in a single origin language and data may be written and/or displayed in multiple origin languages. In one embodiment, PT engine (114) may parse data, extract source string from parsed data, and utilize natural language processing techniques to determine the origin language and encoding of each portion of source string extracted from parsed data. In one embodiment, the PT engine (114) determines the origin language and encoding of different portions of source string extracted from parsed data by consulting a user profile, such as user profile (156). The PT engine (114) may pseudo translate the portions of source string individually or collectively. The PT engine (114) may pseudo translate each portion of source string into the same target language or different target languages. In one embodiment, PT engine (114) proactively selects a target language for each portion of source string based on a target language rule, such as target language rule (126). The PT engine (114), as supported by buffer size wizard (116), can dynamically adapt the pseudo translation for variances in origin languages, origin encodings, and target languages of each portion of the source string. Buffer size wizard (116) supports the adaptation by dynamically determining a different buffer size for each portion of source string based on the origin language and origin encoding of the select portion and the target language for the select portion. Accordingly, the dynamic capability supported by the tools (112)-(116) of the PT manager (110) can automatically create accurate pseudo translations of data having multiple origin languages and/or data pseudo translated into multiple target languages.

Figure 2:
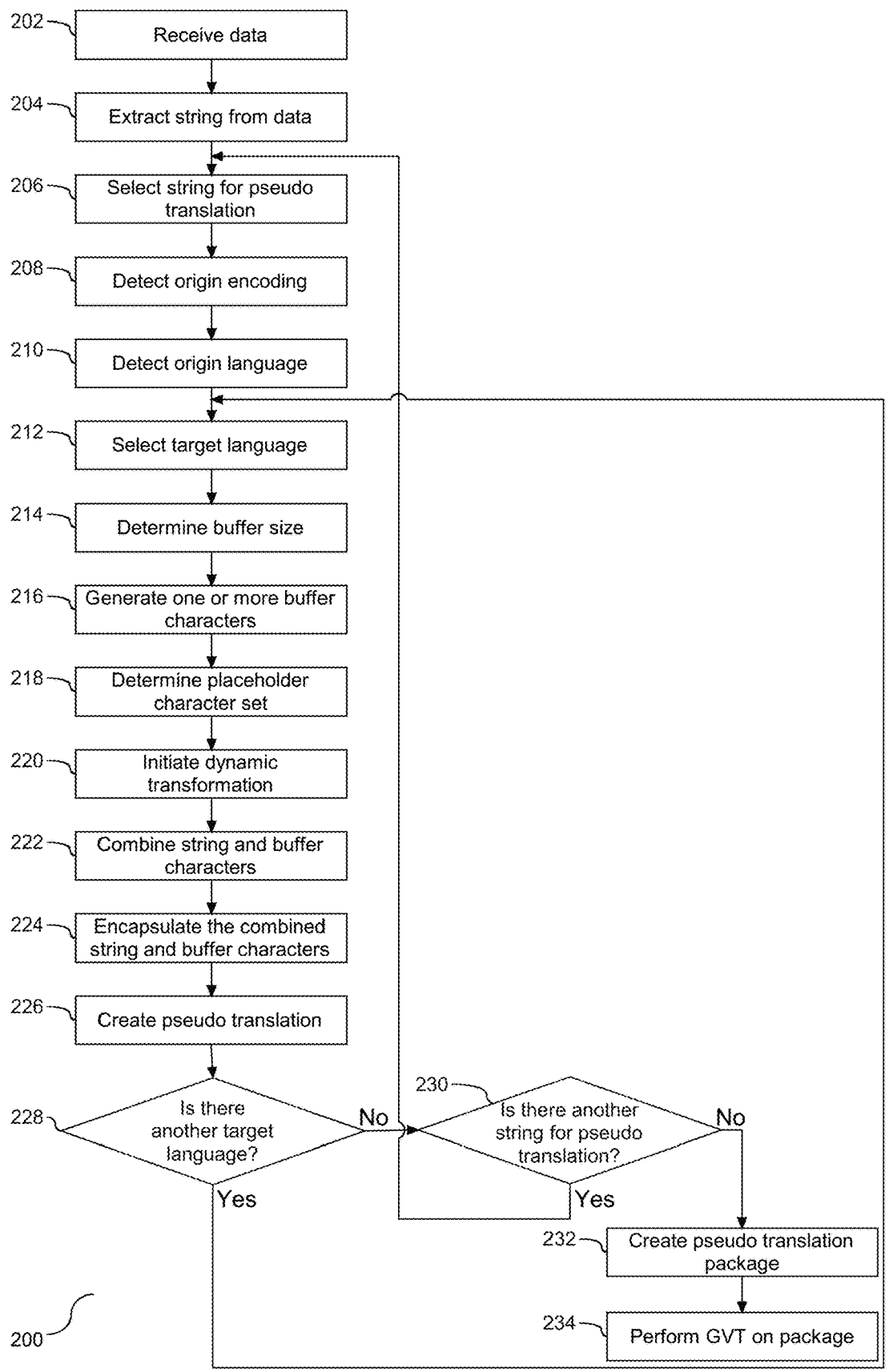
FIG. 2 depicts a flow chart illustrating a process for adaptive pseudo translation of data.

Referring to FIG. 2, a flow chart (200) is provided illustrating a process for adaptive pseudo translation of data. As shown, data requiring pseudo translation is received from an accessing entity (202). Source string is extracted from the received data (204). In one embodiment, the source string is comprised of multiple source strings. The multiple source strings may be in the same origin language, different origin languages, same encoding, and/or different encodings. The quantity of source strings should not be considered limiting. A source string is selected to be pseudo translated (206). The selected source string is dynamically analyzed, including detection of the encoding of the selected source string (208), hereinafter after referred to as origin encoding, and detection of the language of the selected source string (210), hereinafter referred to as origin language. The detection of the origin encoding and origin language of the selected source string may be performed automatically by one or more natural language processing methods. For example, a statistical model, a learning algorithm, a Bayesian classifier, and a nearest-prototype classifier may be used to determine the origin language and encoding. In one embodiment, the detection of the origin encoding and language is performed at the time of extraction of source string. Accordingly, the origin language and encoding of the selected source string is dynamically detected in order to support the adaptive pseudo translation process.

Following the detection of the origin encoding and language at steps (208) and (210) the target language is selected (212). The selection of the target language is a proactive process where the language is selected based on a parameter associated with the accessing entity. In one embodiment, the parameter is associated with a target language rule defining one or more target languages to support the pseudo translation of the selected source string. In one embodiment, the target language rule includes a plurality of target languages to support the pseudo translation of the selected source string. The target language rule may be chosen based on, but not limited to, the accessing entity, data file, origin language, origin encoding, a ranking, and a predefined selection. In one embodiment, the parameter can be dynamically extracted from the accessing entity. For example, the parameter can be extracted from an application the accessing entity is utilizing. In one embodiment, the parameter is extracted from a web browser having English string data and English is select as the target language. Accordingly, a first target language is automatically selected based on a parameter.

The buffer size is determined based on the detected origin encoding and language, and selected target language (214). The determination of the buffer size includes a dynamic process of accessing a mapping defining a correspondence between the selected source string in the origin encoding and origin language, and the selected source string in the target language. The buffer size is used in order to adapt the size of the selected source string in order to account for differences between the selected source string in the origin language and encoding and an actual translation of the selected source string into a target language to produce an accurate pseudo translation. The accurate pseudo translation represents similarity of size and space to an actual translation of the selected source string into the target language. For example, in one embodiment the buffer size is used to account for the size difference between the length of the selected source string in the origin language and the length of an actual translation of the selected source string into the target language. Accordingly, a buffer size is determined to account for a size difference between the origin language and the target language in order to accurately generate a surrogate of an actual translation of the selected source string into the target language wherein the surrogate will accurately represent the performance and display of the actual translation during GVT.

Based on the buffer size determined at step (214), one or more buffer characters are dynamically generated (216). In one embodiment, the buffer characters are in the target language which enables identification of errors in the display of the target language and performance of the characters in the target language during GVT. Thereafter, a placeholder character set is determined (218). In one embodiment, the placeholder character set defines a head character and a tail character. The placeholder character set is used to define the start (e.g. head) and end (e.g. tail) of the pseudo translation which in one embodiment enables detection of truncations of the pseudo translation during GVT testing. In one embodiment, the placeholder character set is determined based on a placeholder character rule. Accordingly, buffer characters and a placeholder character set are generated in order to begin the generation of a pseudo translation.

The dynamic transformation of the selected source string to a pseudo translation is initiated (220). Upon initialization, the buffer characters are combined with the selected source string (222). In one embodiment, the buffer characters are concatenated with the selected source string. The combination is encapsulated within a placeholder character set (224) in order to create the pseudo translation (226). The encapsulation at step (224) may include adding a head character to the beginning of the pseudo translation and a tail character to the end of the pseudo translation. Accordingly, the pseudo translation is created from the selected source string, one or more buffer characters, and placeholder character set.

Following the creation of the pseudo translation at step (226), a determination is made if there is another target language for adaptive pseudo translation for the same selected source string (228). If the response to the determination at step (228) is positive, the process returns back to step (212) and selects another target language. For example, if the first target language was selected based on a target language rule which defined a plurality of target languages, a second target language is selected and the selected source string is pseudo translated into the second target language. However, if the response to the determination at step (228) is negative, the process proceeds to determine if there is another source string to be pseudo translated (230). If the response to the determination at step (230) is positive, the process returns back to step (206) and selects another source string. Accordingly, the pseudo translation process may dynamically and automatically create multiple pseudo translations with each pseudo translation intended to mock a select language.

However, if the response to the determination at step (230) is negative, the pseudo translation process concludes and a pseudo translation package is created (232). In one embodiment, the pseudo translation package includes one or more pseudo translations of a single source string. In one embodiment, the pseudo translation package includes at least two pseudo translations of source string and each pseudo translation is in a different target language. In one embodiment, the pseudo translation package includes two or more pseudo translations of two or more different source strings. In one embodiment, the pseudo translation package is a single file. After creation of the pseudo translation package at step (232), GVT may be performed on the pseudo translated package (234). In one embodiment, the pseudo translation package is transmitted back to the accessing entity in order for the accessing entity to perform the GVT. In one embodiment, the pseudo translation process enhances automated GVT wherein multiple accurate pseudo translations are created in a single pseudo translation package without user intervention. Accordingly, one or more pseudo translations are utilized in GVT in order to determine actual errors that may arise from an actual translation of the data while minimizing false-positives.

Figure 3:
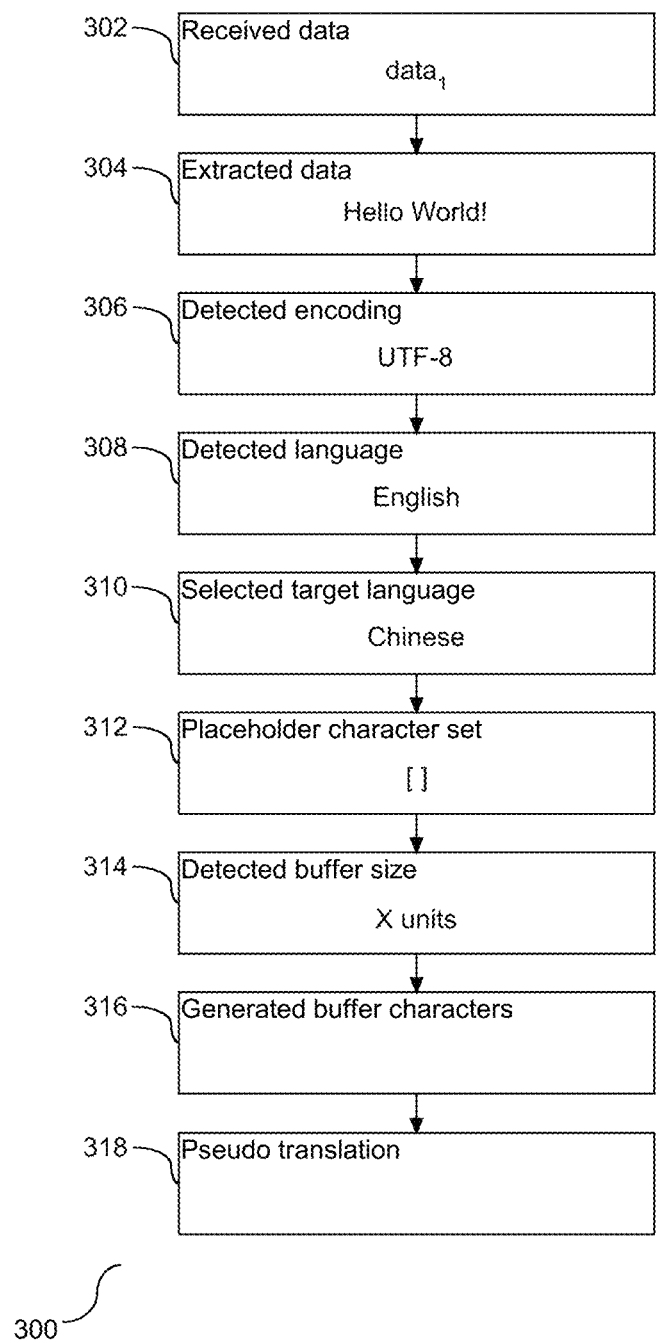
FIG. 3 depicts a flow chart illustrating an adaptive pseudo translation of data from an origin language to a target language.

Referring to FIG. 3, a flow chart (300) is provided illustrating an adaptive pseudo translation of data from an origin language to a target language. As shown, data, $data_1$, is received at step (302). The source string, "Hello World!", is extracted from the received data, $data_1$, at step (304). The encoding of the extracted string, "Hello World!", is detected to be UTF-8 at step (306). The language of the extracted string, "Hello World!", is detected to be English at step (308). The target language is selected at step (310) based on a target language rule. The placeholder character set is selected at step (312). In one embodiment, the placeholder character set includes head character "[" and tail character "]". The buffer size needed for a pseudo translation from the origin language in UTF-8 to the target language in UTF-8 is dynamically determined as X units at step (314). Based on the buffer size of X units, buffer characters are generated at step (316). In one embodiment, the buffer characters are in the target language. The pseudo translation is created by dynamically transforming the source string, "Hello World!" at step (304), into the final pseudo translation. The dynamic transformation at step (318) includes combining the source string, "Hello World!" extracted at step (304), with the buffer characters generated at step (316) and encapsulating the combination with the placeholder character set selected at step (312). Accordingly, data is dynamically analyzed and adaptively pseudo translated in order to provide an accurate surrogate of an actual translation of the source string into the target language.

Figure 4:
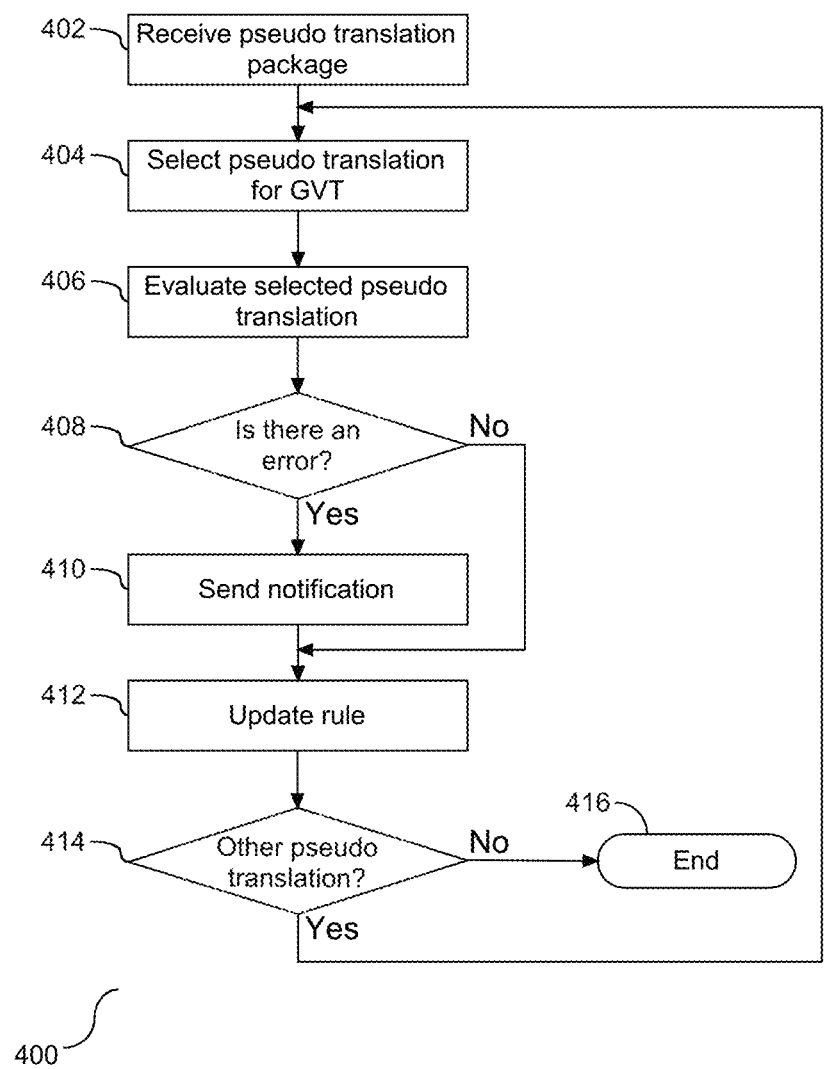
FIG. 4 depicts a flow chart illustrating a process for performing a globalization verification test of the pseudo translation.

Referring to FIG. 4, a flow chart (400) is provided illustrating a process for performing a globalization verification test (GVT) of a pseudo translation. A pseudo translation package is received (402). The GVT process is initiated and a pseudo translation from the pseudo translation package is selected (404). The selected pseudo translation is evaluated for potential errors (406). In one embodiment, the potential errors may be, but are not limited to, clipping of a head and/or tail character, improper display of a target language character (e.g. target language character not supported), improper display of a pseudo translation (e.g. improper size, improper length, missing characters, etc.), performance error in execution of software (e.g. program freeze, font loading, font selection, character layout algorithms, infinite loops, bugs, and/or other issues), and/or other error in the pseudo translation. The detection of errors may be performed by a variety of automated or manually processes known in the art. Accordingly, the pseudo translation package undergoes GVT in order to evaluate one or more pseudo translations for potential errors.

Based on the evaluation, a determination is made of whether an error is detected in the pseudo translation. If a positive response is made to the determination at step (408) and an error in the pseudo translation is detected, a notification is sent to a client to correct the error in the original data (410). In one embodiment, the notification may include an error type, target language, and/or the pseudo translation containing the detected error. Following step (410) or a negative response to the determination at step (408), a target language rule is updated (412). In one embodiment, the target language rule update at step (412) includes to add an instruction to pseudo translate the corrected version of the source string into the target language if an error was detected in the first pseudo translation of the source string (412). In one embodiment, the target language rule update at step (412) includes removal of an instruction to pseudo translate the source string into the target language without a detected error. Accordingly, a pseudo translation is evaluated for a potential error and based on the evaluation a target language rule is updated.

The process proceeds to step (414) to determine whether there is another pseudo translation within the pseudo translation package received at step (402) that has to undergo GVT. If the determination at step (414) is positive and there is another pseudo translation to undergo GVT, the process returns to step (404) and selects another pseudo translation from the pseudo translation package. However, if the response at step (414) is negative the process concludes. Accordingly, pseudo translations are used in GVT in order to detect one or more potential errors associated with an actual translation of data or a source string into the target language without performing an actual translation of the data or the source string into the target language.

Aspects of adaptive pseudo translation shown and described in FIGS. 1-4, employ one or more functional tools. In one embodiment, the functional tools are within a functional unit. Aspects of the functional tool, e.g. pseudo translation (PT) manager, and its associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
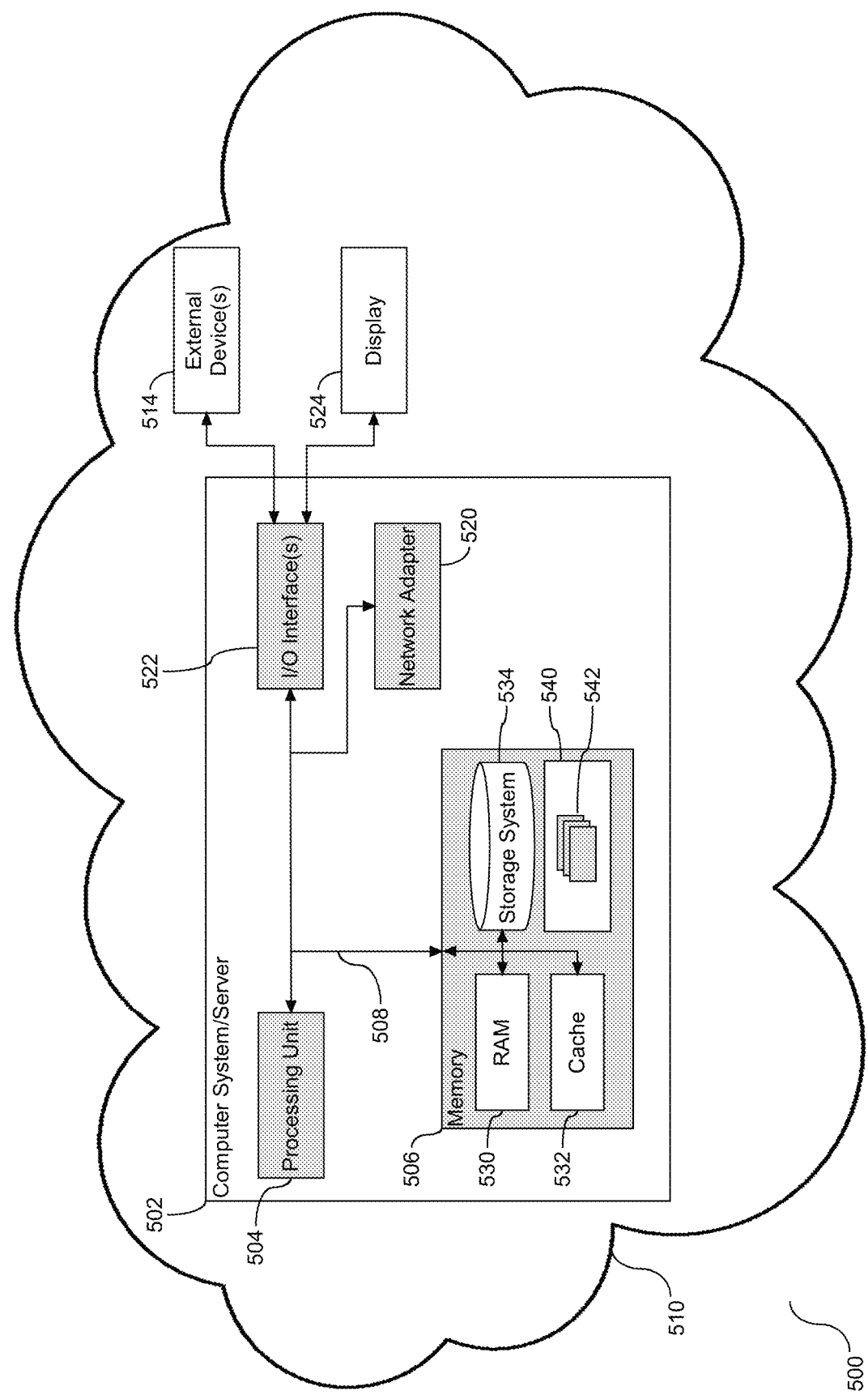
FIG. 5 is a block diagram illustrating an example of a computer system/server of a cloud based support system, to implement the system and process described with respect to FIGS. 1-4.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to store and analyze data. For example, the set of program modules (542) may include the modules configured as a PT manager in order to perform adaptive pseudo translations described in FIGS. 1-4.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (502) is a node (510) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
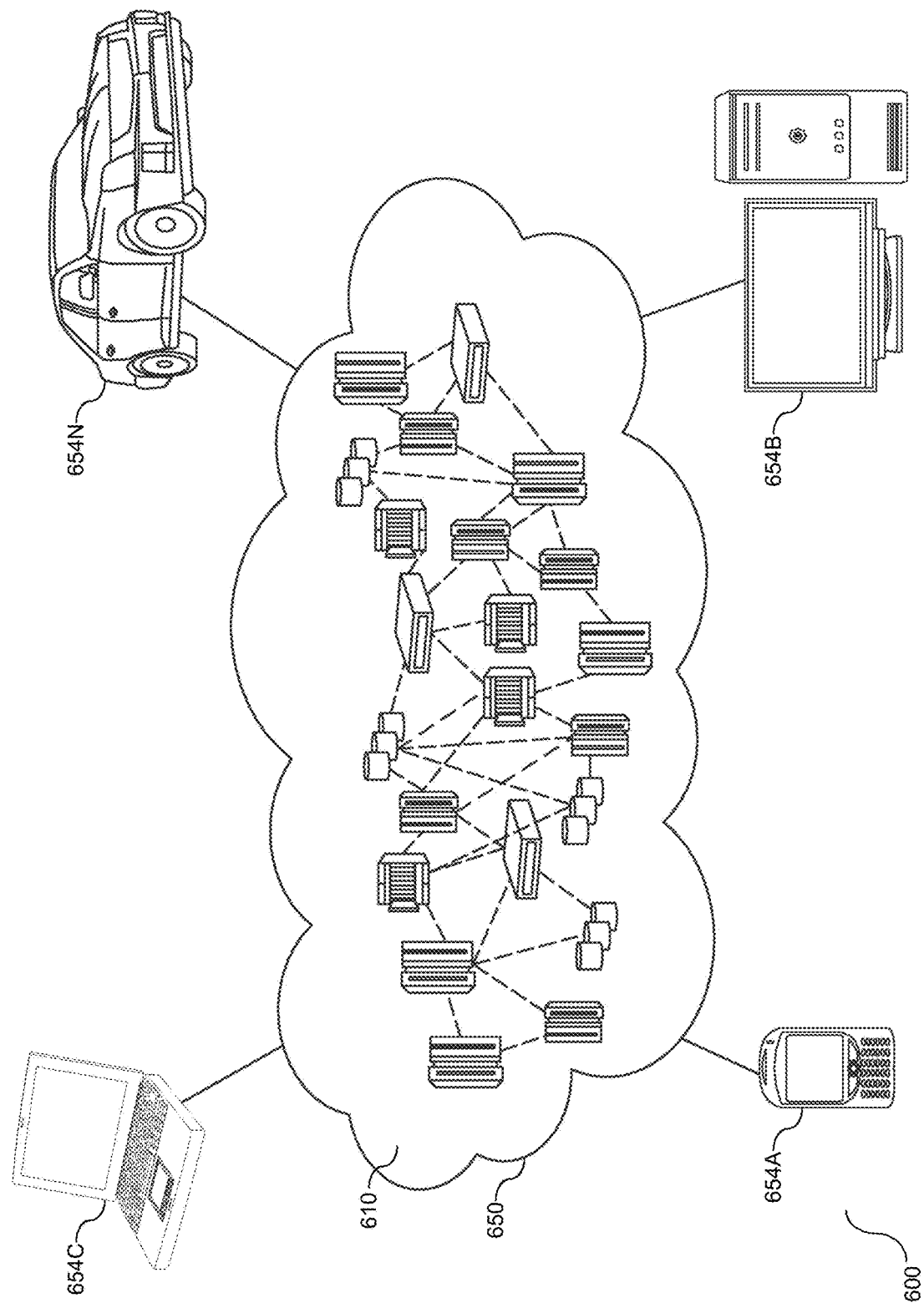
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (754A-N) shown in FIG. 6 are intended to be illustrative only and that the cloud computing environment (650) can communicate with any type of computerized device over any type of network and/or network addressable connection (e.g., using a web browser).

Figure 7:
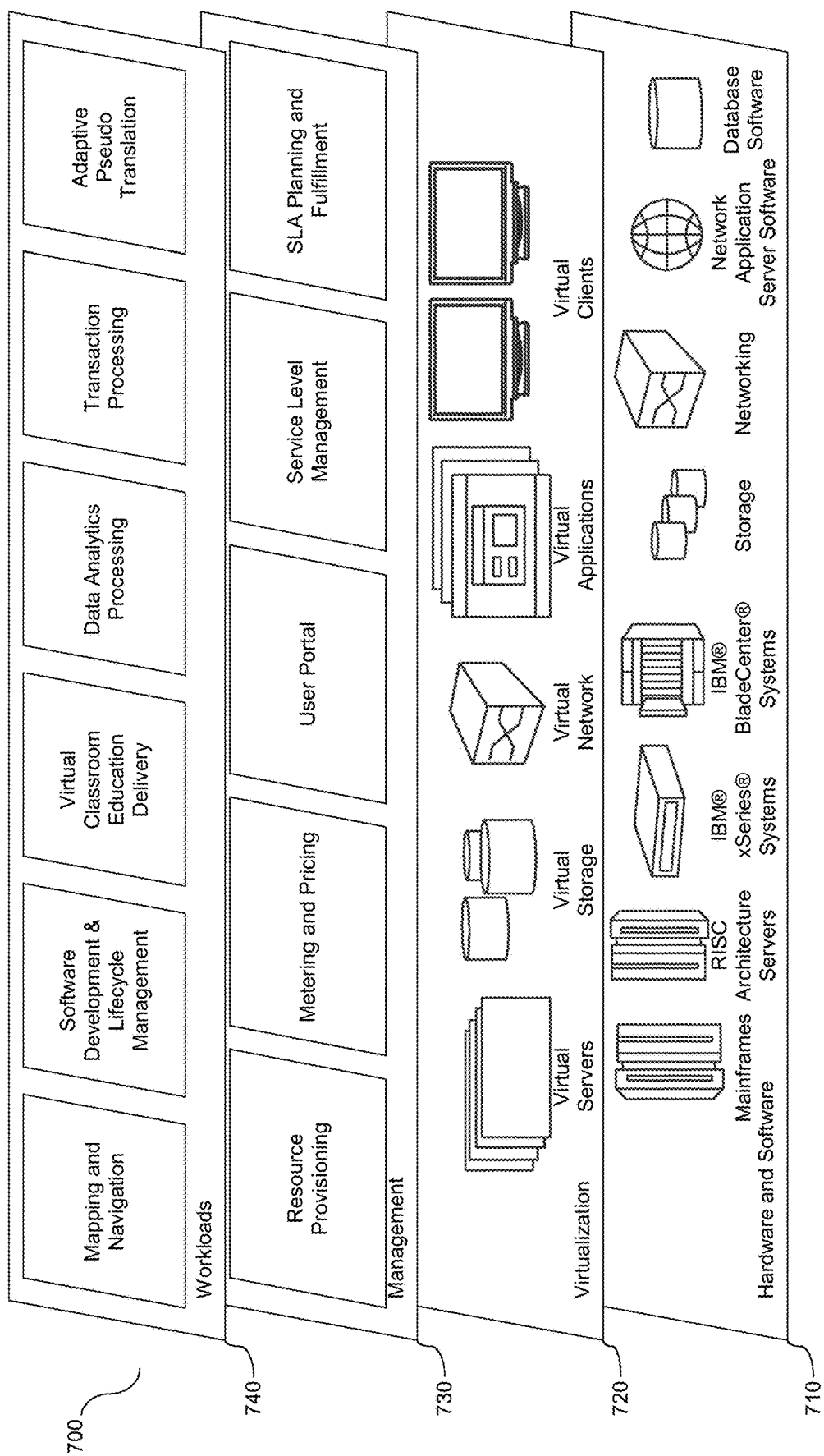
FIG. 7 depicts a block diagram illustrating a set of functional abstraction model layers provided by the cloud computing environment.

Referring now to FIG. 7, a set of functional abstraction layers provided by the cloud computing network of FIG. 5 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and adaptive pseudo translation.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Adaptive pseudo translation automates and dynamically adjusts the generated pseudo translation of software, a message, data and/or string based on one or more detected parameter and/or setting. The dynamic adjustment of the generated pseudo translation enables a highly accurate pseudo translation to be generated which increases the detection of actual errors while minimizing the detection of false errors while undergoing GVT. Accordingly, the implementation of adaptive pseudo translation automates the pseudo translation process based on one or more rule and one or more dynamically detected parameter.

It will be appreciated that, although specific embodiments have been described herein for purposes of illustration, various modifications may be made without departing from the spirit and scope of the embodiments. In particular, the type and quantity of languages and encodings should not be considered limiting. In one embodiment, the original software, message, data and/or string may be in multiple different origin languages and pseudo translated into one or more target languages. In one embodiment, the tools of the pseudo translation manager may be stored on different servers or client machines. Similarly, in one embodiment, adaptive pseudo translation can be performed by an application on a server. Accordingly, the scope of protection of these embodiments is limited only by the following claims and their equivalents.

What is claimed is:

1. A computer system comprising:
   a processing unit in communication with a memory;
   the memory comprising instructions to adaptively generate a pseudo translation and the processing unit configured to execute the instructions to:
      responsive to selection of a first target language, dynamically determine a first buffer size based on a detected origin language, a detected encoding, and the selected first target language;
      generate one or more first buffer characters based on the determined first buffer size; and
      dynamically transform an extracted string of received data into a first pseudo translated text comprising:
         combine the one or more first buffer characters and the extracted string; and
         encapsulate the combined first buffer characters and the extracted string within a first placeholder character set.

2. The system of claim 1, wherein combining the one or more first buffer characters and the extracted string further comprises the processing unit to concatenate the one or more first buffer characters and the extracted string.

3. The system of claim 1, further comprising proactively selecting the first target language utilizing a parameter associated with an accessing entity comprising the processing unit to dynamically extract the parameter from the accessing entity.

4. The system of claim 3, further comprising the processing unit to:
   proactively select a second target language utilizing a second parameter associated with the accessing entity, wherein the first target language and second target language are different;
   responsive to the selection of the second target language, dynamically determine a second buffer size based on the detected origin language, the detected encoding, and the selected second target language;
   generate one or more second buffer characters based on the determined second buffer size; and
   automatically transform the extracted string into a second pseudo translated text comprising:
      combine the second one or more buffer characters and the extracted string; and
      encapsulate the combined second one or more buffer characters and the extracted string within a second placeholder character set; and
   create a pseudo translated text package including combining the first pseudo translated text and the second pseudo translated text.

5. The system of claim 1, wherein the one or more first buffer characters are created in the first target language.

6. The system of claim 1, further comprising a globalization verification test module to detect an error in the first pseudo translated text including an incorrect representation of the first placeholder character set.

7. The system of claim 1, wherein software is provided as a service in a cloud environment to generate the first pseudo translated text.

8. A computer program product for adaptively generating a pseudo translation, the computer program product comprising a computer readable hardware storage medium having program code embodied therewith, the program code executable by a processor to:
   responsive to selection of a first target language, dynamically determine a first buffer size based on a detected origin language, a detected encoding, and the selected first target language;
   generate one or more first buffer characters based on the determined first buffer size; and
   automatically transform an extracted string of received data into a first pseudo translated text comprising:
      combine the one or more first buffer characters and the extracted string; and
      encapsulate the combined first buffer characters and the extracted string within a first placeholder character set.

9. The computer program product of claim 8, wherein combining the one or more first buffer characters and the extracted string further comprises program code to concatenate the one or more first buffer characters and the extracted string.

10. The computer program product of claim 8, further comprising proactively selecting the first target language utilizing a parameter associated with an accessing entity comprising program code to dynamically extract the parameter from the accessing entity.

11. The computer program product of claim 10, further comprising program code to:
   proactively select a second target language utilizing a second parameter associated with the accessing entity, wherein the first target language and second target language are different;
   responsive to the selection of the second target language, dynamically determine a second buffer size based on the detected origin language, the detected encoding, and the selected second target language;
   generate one or more second buffer characters based on the determined second buffer size; and
   automatically transform the extracted string into a second pseudo translated text comprising:
      combine the second one or more buffer characters and the extracted string; and
      encapsulate the combined second one or more buffer characters and the extracted string within a second placeholder character set; and
   create a pseudo translated text package including combining the first pseudo translated text and the second pseudo translated text.

12. The computer program product of claim 8, wherein the one or more first buffer characters are created in the first target language.

13. The computer program product of claim 8, further comprising program code to detect an error in the first pseudo translated text including an incorrect representation of the first placeholder character set.

14. A method for adaptively generating a pseudo translation comprising:
   responsive to the selection of a first target language, dynamically determining a first buffer size based on a detected origin language, a detected encoding, and the selected first target language;
   generating one or more first buffer characters based on the determined first buffer size; and
   automatically transforming an extracted string of received data into a first pseudo translated text comprising:
      combining the one or more first buffer characters and the extracted string; and
      encapsulating the combined first buffer characters and the extracted string within a first placeholder character set.

15. The method of claim 14, wherein the combining the one or more first buffer characters and the extracted string further comprises concatenating the one or more first buffer characters and the extracted string.

16. The method of claim 14, further comprising proactively selecting the first target language utilizing a parameter associated with an accessing entity comprising, dynamically extracting the parameter from the accessing entity.

17. The method of claim 16, further comprising:
proactively selecting a second target language utilizing a second parameter associated with the accessing entity, wherein the first target language and second target language are different;
responsive to the selection of the second target language, dynamically determining a second buffer size based on the detected origin language, the detected encoding, and the selected second target language;
generating one or more second buffer characters based on the determined second buffer size; and
automatically transforming the extracted string into a second pseudo translated text comprising:
combining the second one or more buffer characters and the extracted string; and
encapsulating the combined second one or more buffer characters and the extracted string within a second placeholder character set; and
creating a pseudo translated text package including combining the first pseudo translated text and the second pseudo translated text.

18. The method of claim 14, wherein the one or more first buffer characters are created in the first target language.

19. The method of claim 14, further comprising:
detecting an error in the first pseudo translated text including an incorrect representation of the first placeholder character set.

20. The method of claim 14, wherein software is provided as a service in a cloud environment to generate the first pseudo translated text.

* * * * *